(12) United States Patent
Osawa et al.

(10) Patent No.: US 8,866,088 B2
(45) Date of Patent: Oct. 21, 2014

(54) RADIATION IMAGE CONVERSION PANEL

(75) Inventors: Hirotake Osawa, Hamamatsu (JP);
Shintaro Toyama, Hamamatsu (JP);
Yutaka Kusuyama, Hamamatsu (JP);
Masanori Yamashita, Hamamatsu (JP);
Munenori Shikida, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 60 days.

(21) Appl. No.: 13/522,568

(22) PCT Filed: Jan. 13, 2011

(86) PCT No.: PCT/JP2011/050460
§ 371 (c)(1), (2), (4) Date: Jul. 17, 2012

(87) PCT Pub. No.: WO2011/093140
PCT Pub. Date: Aug. 4, 2011

(65) Prior Publication Data
US 2012/0312998 A1    Dec. 13, 2012

(30) Foreign Application Priority Data

Jan. 29, 2010  (JP) ................................ 2010-018548
Jan. 29, 2010  (JP) ................................ 2010-018563

(51) Int. Cl.
| | | |
|---|---|---|
| *G01T 1/20* | (2006.01) | |
| *G01T 1/202* | (2006.01) | |
| *C09K 11/62* | (2006.01) | |
| *C09K 11/77* | (2006.01) | |
| *G21K 4/00* | (2006.01) | |

(52) U.S. Cl.
CPC .............. *G01T 1/202* (2013.01); *C09K 11/628* (2013.01); *C09K 11/7733* (2013.01); *G21K 4/00* (2013.01)
USPC ....................................... 250/366

(58) Field of Classification Search
CPC ...................................... G01T 1/1642
USPC ........................................... 250/366
See application file for complete search history.

(56) References Cited

U.S. PATENT DOCUMENTS

2004/0046129 A1*  3/2004  Hosoi et al. ................. 250/484.4
2004/0195514 A1* 10/2004  Nagano ..................... 250/370.11
(Continued)

FOREIGN PATENT DOCUMENTS

| CN | 1886675 | 12/2006 |
|---|---|---|
| CN | 101542635 | 9/2009 |

(Continued)

*Primary Examiner* — David Porta
*Assistant Examiner* — Hugh H Maupin
(74) *Attorney, Agent, or Firm* — Drinker Biddle & Reath LLP

(57) ABSTRACT

A radiation image conversion panel which can improve its optical output and resolution is provided. A radiation image conversion panel 1 comprises a FOP 2, a heat-resistant resin layer 3 formed on a main face 2a of the FOP 2, and a scintillator 4 formed by vapor deposition on a main face 3a of the heat-resistant layer 3 on a side opposite from the FOP 2 and made of a columnar crystal. In this radiation image conversion panel 1, the main face 3a of the heat-resistant resin layer 3 has a surface energy of at least 20 [mN/m] but less than 35 [mN/m]. This can make the crystallinity of the root part of the scintillator 4 favorable, so as to inhibit the root part of the scintillator 4 from becoming harder to transmit and easier to scatter the output light.

13 Claims, 8 Drawing Sheets

(56) References Cited

U.S. PATENT DOCUMENTS

2006/0263521 A1* 11/2006 Sato et al. .................. 427/248.1
2008/0095997 A1* 4/2008 Chiang et al. ................ 428/215

FOREIGN PATENT DOCUMENTS

| | | |
|---|---|---|
| CN | 101657737 | 2/2010 |
| JP | 63-215987 | 9/1988 |
| JP | 5-39558 | 6/1993 |
| JP | 2004-61115 | 2/2004 |
| JP | 2005-106541 | 4/2005 |
| JP | 2006-250909 | 9/2006 |
| JP | 2008-209124 | 9/2008 |

* cited by examiner (a)

|  | SURFACE ENERGY OF HEAT-RESISTANT RESIN LAYER (mN/m) | CRYSTALLINITY IN ROOT PART |
|---|---|---|
| SAMPLE A | 32.7 | ○ |
| SAMPLE B | 24.8 | ○ |
| SAMPLE C | 30.8 | ○ |
| SAMPLE D | 41.8 | × |

|  | OPTICAL OUTPUT (RELATIVE RATIO) | RESOLUTION (RELATIVE RATIO) |
|---|---|---|
| EMBODIMENT | 111% | 112% |
| CONVENTIONAL | 100% | 100% |

(b)

|  | OPTICAL OUTPUT (RELATIVE RATIO) | RESOLUTION (RELATIVE RATIO) |
|---|---|---|
| EMBODIMENT | 109% | 123% |
| CONVENTIONAL | 100% | 100% |

(a)

(b)

RADIATION IMAGE CONVERSION PANEL

TECHNICAL FIELD

The present invention relates to a radiation image conversion panel.

BACKGROUND ART

As a scintillator panel, which is a kind of conventional radiation image conversion panels, one comprising a substrate, a resin layer formed on the substrate, and a scintillator (phosphor) formed by vapor deposition on the resin layer and made of a columnar crystal has been known (see, for example, Patent Literatures 1 and 2).

Also known as a scintillator panel, which is a kind of conventional radiation image conversion panels, is one comprising a fiber optic plate (hereinafter also referred to as "FOP") and a scintillator (phosphor) formed by vapor deposition on the resin layer and made of a columnar crystal as disclosed in Patent Literature 3, for example. This scintillator panel is covered with a film, so as to be secured and supported.

CITATION LIST

Patent Literature

Patent Literature 1: Japanese Patent Application Laid-Open No. 2004-61115

Patent Literature 2: Japanese Patent Application Laid-Open No. 2008-209124

Patent Literature 3: Japanese Patent Publication No. 5-39558

SUMMARY OF INVENTION

Technical Problem

In the above-mentioned scintillator panel, crystallinity may deteriorate in a substrate-side end part (FOP-side end part, i.e., root part) of the vapor-deposited scintillator, thereby making the root part harder to transmit and easier to scatter scintillation light. As a result, there is a case where the above-mentioned scintillator panel lowers its optical output and resolution.

It is therefore an object of the present invention to provide a radiation image conversion panel which can improve the optical output and resolution.

Solution to Problem

For achieving the above-mentioned object, the inventors conducted diligent studies and, as a result, have found out that there is a correlation between the surface energy (surface tension) of a main face of a resin layer on which a phosphor is formed by vapor deposition and the crystallinity of the root part of the phosphor. Then, the inventors have thought up that the crystallinity of the root part of the phosphor can be made favorable if the surface energy is appropriate and thus completed the present invention.

That is, in one aspect, the radiation image conversion panel in accordance with the present invention comprises a substrate, a resin layer formed on a main face of the substrate, and a phosphor formed by vapor deposition on a main face of the resin layer on a side opposite from the substrate and made of a columnar crystal, wherein at least the main face of the resin layer has a surface energy of at least 20 [mN/m] but less than 35 [mN/m].

This radiation image conversion panel can inhibit the root part of the phosphor from becoming harder to transmit and easier to scatter output light (e.g., photostimulated luminescence or scintillation light), whereby the optical output and resolution of the radiation image conversion panel can be improved. This is because of the fact that the crystallinity of the root part of the phosphor becomes favorable when the main face of the resin layer where the phosphor is formed by vapor deposition has a surface energy of at least 20 [mN/m] but less than 35 [mN/m].

Here is a case where the resin layer is formed by a silicone resin. There is also a case where the resin layer is formed by a step-cured resin subjected to a step-by-step curing process.

Preferably, the surface energy of at least the main face of the resin layer is set according to the crystallinity of the phosphor. In this case, appropriately setting the surface energy of the main face of the resin layer, for example, can make the crystallinity of the phosphor favorable, thereby improving the optical output and resolution of the radiation image conversion panel.

In another aspect, the radiation image conversion panel in accordance with the present invention comprises a substrate, a resin layer formed on a main face of the substrate, and a phosphor formed by vapor deposition on a main face of the resin layer on a side opposite from the substrate and made of a columnar crystal, wherein the phosphor is constructed such that the columnar crystal has a pillar form on the substrate side.

In still another aspect, the radiation image conversion panel in accordance with the present invention comprises a substrate, a resin layer formed on a main face of the substrate, and a phosphor formed by vapor deposition on a main face of the resin layer on a side opposite from the substrate and made of a columnar crystal, wherein the columnar crystal on the substrate side of the phosphor has a pillar form substantially equal to that of the columnar crystal on the opposite side.

Any of these aspects of the present invention can make the crystallinity of the root part of the phosphor favorable, so as to inhibit the root part of the phosphor from becoming harder to transmit and easier to scatter the output light, whereby the optical output and resolution of the radiation image conversion panel can be improved.

There are cases where the substrate is a radiation-transmitting substrate, a fiber optic plate, and an image sensor, respectively.

Also, for achieving the above-mentioned object, the inventors conducted diligent studies and, as a result, have found that forming a phosphor by vapor deposition on a heat-resistant resin layer can favorably vapor-deposit the phosphor, whereby the crystallinity of the root part of the phosphor can be made favorable. Then, the inventors have thought up that the optical output and resolution of the radiation image conversion panel can be improved according to the finding and thus completed the present invention.

That is, in yet another aspect, the radiation image conversion panel in accordance with the present invention is a radiation image conversion panel comprising a fiber optic plate constituted by a bundle of a plurality of optical fibers and a phosphor made of a columnar crystal, the radiation image conversion panel further comprising a heat-resistant resin layer formed on a main face of the fiber optic plate and transparent to output light emitted from the phosphor, wherein the phosphor is formed by vapor deposition on a main face of the heat-resistant resin layer on a side opposite from the fiber optic plate.

In this radiation image conversion panel, a heat-resistant resin layer transparent to output light (e.g., photostimulated luminescence or scintillation light) is formed on a FOP, while a phosphor is formed by vapor deposition on a main face of the heat-resistant resin layer. Therefore, because of the reason mentioned above, the crystallinity of the root part of the phosphor made of the columnar crystal can be favorable, so as to inhibit the root part from becoming harder to transmit and easier to scatter the output light. Hence, the optical output and resolution of the radiation image conversion panel can be improved.

Here is a case where the resin layer is formed by a silicone resin. There is also a case where the resin layer is formed by a step-cured resin subjected to a step-by-step curing process.

Preferably, a curing condition of the heat-resistant resin layer is set according to the crystallinity of the phosphor. In this case, appropriately setting the curing condition of the resin layer, for example, can make the crystallinity of the phosphor favorable, thereby improving the optical output and resolution of the radiation image conversion panel.

In a further aspect, the radiation image conversion panel in accordance with the present invention is a radiation image conversion panel comprising a fiber optic plate constituted by a bundle of a plurality of optical fibers, a heat-resistant resin layer formed on a main face of the fiber optic plate, and a phosphor formed by vapor deposition on a main face of the heat-resistant layer on a side opposite from the fiber optic plate and made of a columnar crystal, wherein the phosphor is constructed such that the columnar crystal has a pillar form on the fiber optic plate side.

In a still further aspect, the radiation image conversion panel in accordance with the present invention is a radiation image conversion panel comprising a fiber optic plate constituted by a bundle of a plurality of optical fibers, a heat-resistant resin layer formed on a main face of the fiber optic plate, and a phosphor formed by vapor deposition on a main face of the heat-resistant layer on a side opposite from the fiber optic plate and made of a columnar crystal, wherein the columnar crystal on the fiber optic plate side of the phosphor has a pillar form substantially equal to that of the columnar crystal on the opposite side.

Any of these aspects of the present invention can make the crystallinity of the root part of the phosphor favorable, so as to inhibit the root part of the phosphor from becoming harder to transmit and easier to scatter the output light emitted from the phosphor, whereby the optical output and resolution of the radiation image conversion panel can be improved.

Advantageous Effects of Invention

The present invention can improve the optical output and resolution in radiation image conversion panels.

BRIEF DESCRIPTION OF DRAWINGS

[FIG. 3] is a result of experiments illustrating the correlation between the surface energy of heat-resistant resin layers and the crystallinity of scintillators;

[FIG. 5] is a set of charts illustrating tendencies of the optical output and resolution of scintillator panels;

DESCRIPTION OF EMBODIMENTS

In the following, preferred embodiments of the present invention will be explained in detail with reference to the drawings. In the following explanations, the same or equivalent constituents will be referred to with the same signs, while omitting their overlapping descriptions.

Figure 1:
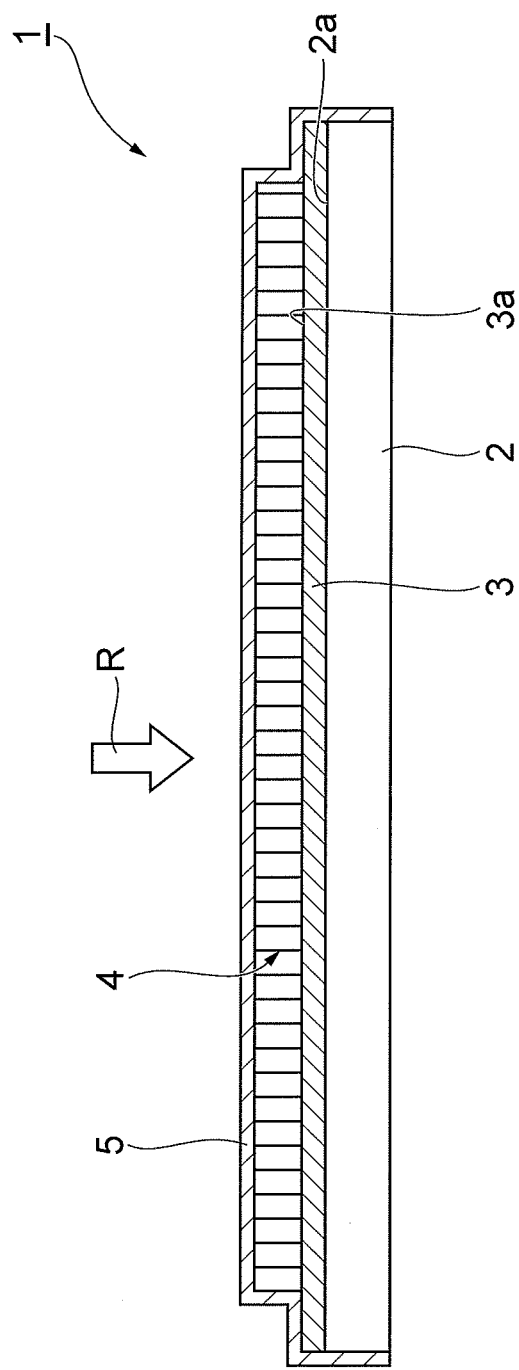
[FIG. 1] is a schematic side sectional view illustrating the scintillator panel in accordance with an embodiment of the present invention.

A scintillator panel, which is a radiation image conversion panel, will now be explained. FIG. 1 is a schematic side sectional view illustrating the scintillator panel in accordance with an embodiment of the present invention. As illustrated in FIG. 1, the scintillator panel (radiation image conversion panel) 1 in accordance with this embodiment is used for converting a radiation R such as an x-ray incident thereon into scintillation light and detecting it. Here, the scintillator panel 1 is of a FOS (Fiber Optic plate with x-ray Scintillation) type using a FOP as a substrate. The scintillator panel 1 is used in mammography systems, breast screening systems, CT systems, and dental intraoral photography systems, for example.

The scintillator panel 1 comprises an FOP (substrate) 2, a heat-resistant resin layer (resin layer) 3 disposed on a front face (main face) 2a of the FOP 2, a scintillator (phosphor) 4 formed by vapor deposition on a front face (main face) 3a of the heat-resistant resin layer 3 on the side opposite from the FOP 2, and a protective layer 5 provided so as to cover the FOP 2, heat-resistant resin layer 3, and scintillator 4.

The FOP 2 is an optical device constructed by a bundle of optical fibers each having a size of several microns, for example. The FOP 2 has a rectangular plate form. A photoelectric conversion element (not depicted) such as an image pickup device is optically coupled to the FOP 2. As a consequence, the scintillation light is transmitted to the photoelectric conversion element with high efficiency and low distortion.

The heat-resistant layer 3 is a resin layer (so-called clear resin layer) transparent to the scintillation light. The heat-resistant layer 3 is formed by being applied to the front face 2a of the FOP 2. The heat-resistant layer 3 has such a predetermined heat resistance as to be able to endure at least the heating at the time of vapor-depositing the scintillator 4.

By "transparent" is meant herein having such a property as to transmit therethrough "light to which the photoelectric conversion element optically coupled to the FOP 2 is sensitive." Therefore, when utilizing a photoelectric conversion element having a sensitivity in a specific wavelength band in visible light, for example, the heat-resistant resin layer 3 may be nontransparent to the visible light on the outside of the sensitive region. When employing a photoelectric conversion element which is sensitive to infrared or ultraviolet rays instead of the visible light, the heat-resistant resin layer 3 may be nontransparent to the visible light as long as it can transmit therethrough light to which the photoelectric conversion element is sensitive. Hence, the heat-resistant resin layer 3 may be colored not only transparent, but also semitransparent gray or the like in order to adjust the optical output.

The scintillator 4 is a phosphor layer which converts the incident radiation R into the scintillation light. The scintillator 4 emits light according to the dose of the incident radiation R. The scintillator 4 is formed by vacuum vapor deposition of Tl (thallium)-doped CsI (cesium iodide), which is constituted by a forest of a plurality of columnar crystals (acicular crystals each having a column diameter of several µm), on the front face 3a of the heat-resistant resin layer 3.

The protective layer 5 is used for protecting the FOP 2, heat-resistant resin layer 3, and scintillator 4 against moisture and the like. The protective layer 5 is formed by CVD (chemical vapor deposition) so as to cover the FOP 2, heat-resistant resin layer 3, and scintillator 4. An organic film such as one made of polyp-xylylene) or an inorganic film is used as the protective layer 5.

Here, the heat-resistant resin layer 3 of this embodiment is formed by a silicone resin. In other words, the heat-resistant resin layer 3 is a silicone-based resin layer mainly composed of a silicone resin. The heat-resistant resin layer 3 is formed by applying a resin and then curing it by heat, which includes that of normal temperature, or by irradiation with light. The resin may also be a step-cured resin which completely cures through a step-by-step curing process.

At least the front face 3a of the heat-resistant resin layer 3 has a surface energy which is preferably at least 20 [mN/m] but less than 35 [mN/m], more preferably at least 24.8 [mN/m] but less than 32.7 [mN/m]. A typical silicone resin has a surface energy of about 20 [mN/m].

The surface energy in this embodiment is determined by measuring contact angles of test liquids at room temperature and decomposing the solid surface tension into components (three components) by using the extended Fowkes' equation. Specifically, contact angles are measured five times at respective positions where each test liquid is dropped and then are averaged. From thus obtained average value, dispersion, polar, and hydrogen-bonding components are calculated by using the extended Fowkes' equation. The sum of these components is determined as the surface energy. For measuring the contact angles, the static drop method is used, for example. Specifically, a droplet dropped on a surface to be measured is captured in a horizontal direction by a CCD camera, and then thus obtained droplet image is subjected to image processing, so as to measure the contact angle. A plurality of kinds of liquids (four kinds, i.e., water, formamide, diiodomethane, and ethylene glycol, here) are used as the test liquids.

In a scintillator panel of a type using a radiation-transmitting substrate in place of the FOP 2 so as to input a radiation image from the substrate side and emit a visible light image corresponding to the radiation image from the leading end side of the scintillator 4, the heat-resistant resin layer 3 may be formed by a silicone resin containing a pigment so as to function as a reflecting film for increasing the optical output of the scintillator panel 1, for example. A white pigment, a metal, or the like can be used as the pigment. Using the white pigment can enhance the diffuse reflection ratio, thereby further raising the optical output. The heat-resistant resin layer 3 is not limited to those formed by silicone resins as in this embodiment, but may be formed by any of other resins.

The radiation R (radiation image) is incident on thus constructed scintillator panel 1 from the front face 2a side (the upper side in the drawing, i.e., on the light entrance surface side) of the FOP 2 in the scintillator 4 (i.e., the radiation R enters from the leading end side of the scintillator 4). The radiation R passes through the protective layer 5, so as to be made incident on and absorbed by the scintillator 4, thereby being converted into scintillation light (visible light image) having a predetermined wavelength in proportion to the quantity of the radiation R. Thus converted scintillation light passes through the heat-resistant resin layer 3, so as to reach the FOP 2. The FOP 2 transmits the visible light image to the optical output surface of the FOP 2.

Thus constructed scintillator panel 1 can be manufactured by a method illustrated in the following, for example. The FOP 2 is initially washed with wash water, and then the front face 2a of the FOP 2 is coated with the heat-resistant resin layer 3, which is thermally cured thereafter.

Here, the heat-resistant resin layer 3 is a step-cured resin as mentioned above, which is preferably in the B-stage.

A-stage: Immediately after coating with the heat-resistant resin layer 3 (without firing).

B-stage: Stage in the process of the curing reaction of the heat-resistant resin layer 3 fired after coating.

C-stage: Stage where the heat-resistant resin layer 3 is completely cured after coating.

Subsequently, the FOP 2 is heated at 100° C., for example, and then CsI is formed into a film by oblique vapor deposition on the front face 3a of the heat-resistant resin layer 3, so as to form the scintillator 4. Thereafter, the protective layer 5 is formed so as to cover the FOP 2, heat-resistant resin layer 3, and scintillator 4. This can yield the scintillator panel 1.

Figure 2:
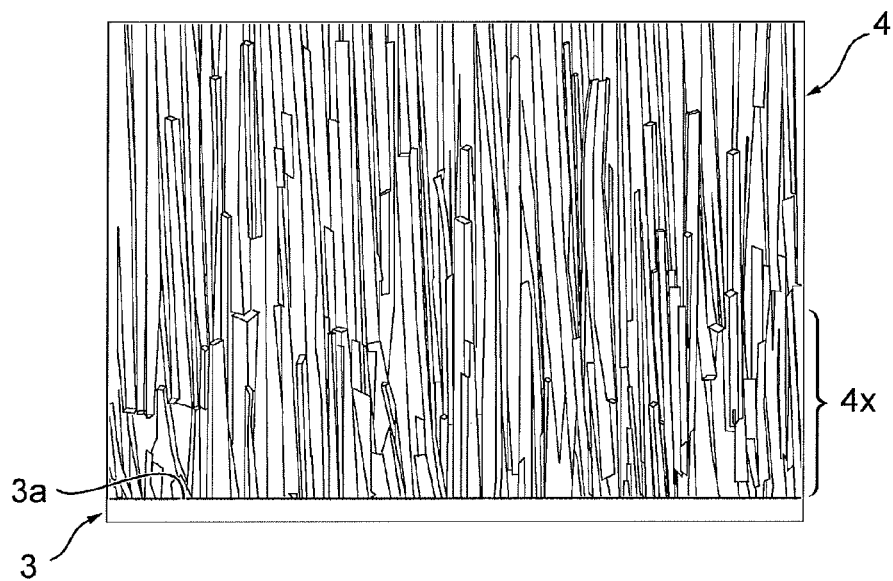
[FIG. 2] is a set of enlarged views illustrating root parts of columnar crystalline scintillators.
Figure 2:
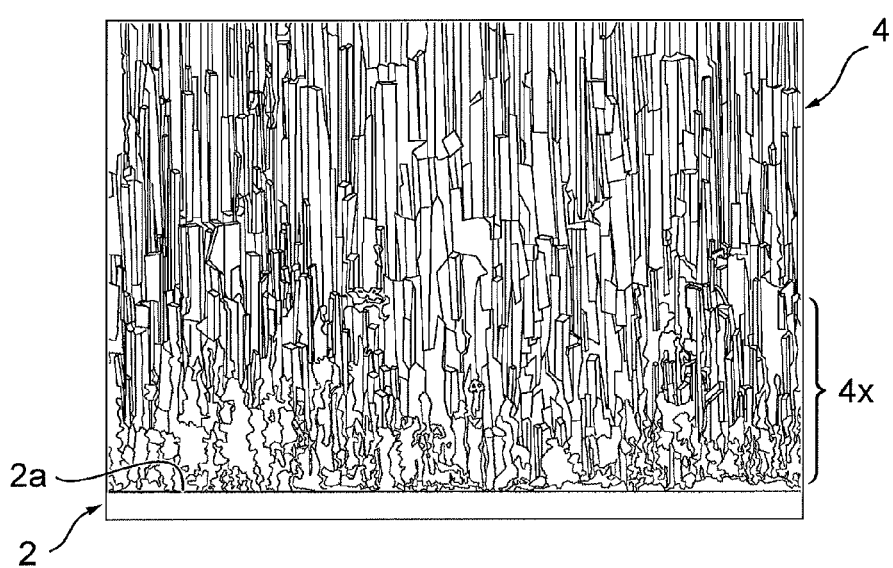

FIG. 2 is a set of enlarged views illustrating root parts of scintillators. FIG. 2(a) is an enlarged view of the root part of the scintillator in the scintillator panel of this embodiment, whereas FIG. 2(b) is an enlarged view of the root part of a scintillator in a conventional scintillator panel. The conventional scintillator panel (also referred to as "conventional product" in the following) is one in which the scintillator 4 is formed by vapor deposition on the front face 2a of the FOP 2 without forming the heat-resistant resin layer 3 therebetween (the same hereinafter).

In the vapor-deposited scintillator 4 in the conventional product, as illustrated in FIG. 2(b), the crystallinity deteriorates in particular in the end part 4x on the FOP 2 side (i.e., the root part 4x on the vapor deposition start side), so that, for example, the crystal shape (pillar form) breaks into lumps while yielding large variations. Hence, there is a fear of the root part 4x becoming harder to transmit and easier to scatter the scintillation light in the conventional product. By the root part 4x is meant a crystal part from the front face 2a of the FOP 2 to about 30 µm thereabove (the same also applies to the following root part 4x).

In this regard, the crystallinity in the root part 4x of the scintillator 4 is improved and made favorable in this embodiment as illustrated in FIG. 2(a). Specifically, the columnar crystal in the root part 4x beautifully extends straight while keeping its pillar form with less variations. In other words, in the scintillator 4, the columnar crystal in the root part 4x (on the FOP 2 side) has a pillar form substantially equal to that of the columnar crystal on the leading end side (on the side opposite from the FOP 2). This greatly ameliorates the passability of emission (output), so as to improve the optical output, while inhibiting the scintillation light from scattering, whereby the resolution becomes higher.

This is because the scintillator 4 is favorably vapor-deposited when formed by vapor deposition on the heat-resistant resin layer 3. This seems to be because of the fact that, in the heat-resistant resin layer 3, the surface energy of its front face 3a becomes so low that, when a vapor flow (gas) of CsI attaches thereto, fine particles of CsI are likely to shrink, thereby making it easier for columnar crystals to form from early stages of vapor deposition.

Meanwhile, as mentioned above, the FOP 2 is heated when manufacturing the scintillator panel 1 in this embodiment. Hence, the columnar crystal is thicker in the root part 4x of the scintillator 4.

FIG. 3 is a result of experiments illustrating the correlation between the surface energy of heat-resistant resin layers and the crystallinity of scintillators. In the chart, "O" and "X" mean that the crystallinity in the root part 4x is favorable and poor, respectively. Each of samples A to C is a scintillator panel in which the heat-resistant resin layer 3 is formed by a silicone resin. The curing condition for the heat-resistant resin layer 3 is A-, B-, and C-stages for the samples A, B, and C, respectively. In the sample C, the heat-resistant resin layer 3 contains a white pigment. Sample D is a scintillator panel in which the heat-resistant resin layer 3 is formed by poly(p-xylylene).

As illustrated in FIG. 3, the crystallinity in the root part 4x is favorable in the samples A, B, and C in which the surface energy of the front face 3a is 32.7 [mN/m], 24.8 [mN/m], and 30.8 [mN/m], respectively. By contrast, it is seen that the crystallinity in the root part 4x is poor in the sample D in which the surface energy of the front face 3a is 41.8 [mN/m].

Hence, as mentioned above, the surface energy of the front face 3a of the heat-resistant resin layer 3 is at least 20 [mN/m] but less than 35 [mN/m], more preferably at least 24.8 [mN/m] but less than 32.7 [mN/m], in this embodiment. Therefore, this embodiment can make the crystallinity of the root part 4x favorable, so as to inhibit the root part 4x from becoming harder to transmit and easier to scatter the scintillation light, whereby the optical output and resolution of the scintillator panel can be improved.

Figure 4:
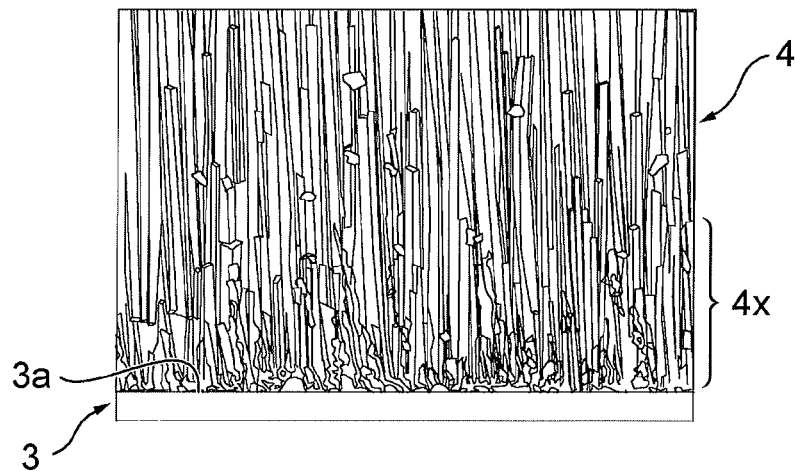
[FIG. 4] is a set of enlarged views of a scintillator illustrating the correlation between the curing condition of a heat-resistant layer and the crystallinity of the scintillator.
Figure 4:
Figure 4:

FIG. 4 is a set of enlarged views of a scintillator illustrating the correlation between the curing condition of a heat-resistant layer and the crystallinity of the scintillator. In the drawings, the heat-resistant resin layer 3 is formed by a silicone resin, while the curing condition for the heat-resistant resin layer 3 is the A-, B-, and C-stages in FIGS. 4(a), 4(b), and 4(c), respectively.

It is seen from FIG. 4 that the crystallinity has improved in the root part 4x in each of the curing conditions at the A-, B-, and C-stages. In particular, the columnar crystal in the root part 4x at the B- and C-stages (FIGS. 4(b) and 4(c)) is more likely to keep its pillar form and remain in a long monolithic state than that at the A-stage (FIG. 4(a)). The crystallinity of the root part 4x is better in the B-stage than in the C-stage.

Hence, as mentioned above, the curing condition for the heat-resistant resin layer 3 is preferably any of the A- to C-stages, more preferably the B- or C-stage, further preferably the B-stage, in this embodiment. This can inhibit the root part 4x from becoming harder to transmit and easier to scatter the scintillation light, whereby the optical output and resolution of the scintillator panel 1 can be improved.

Figure 6:
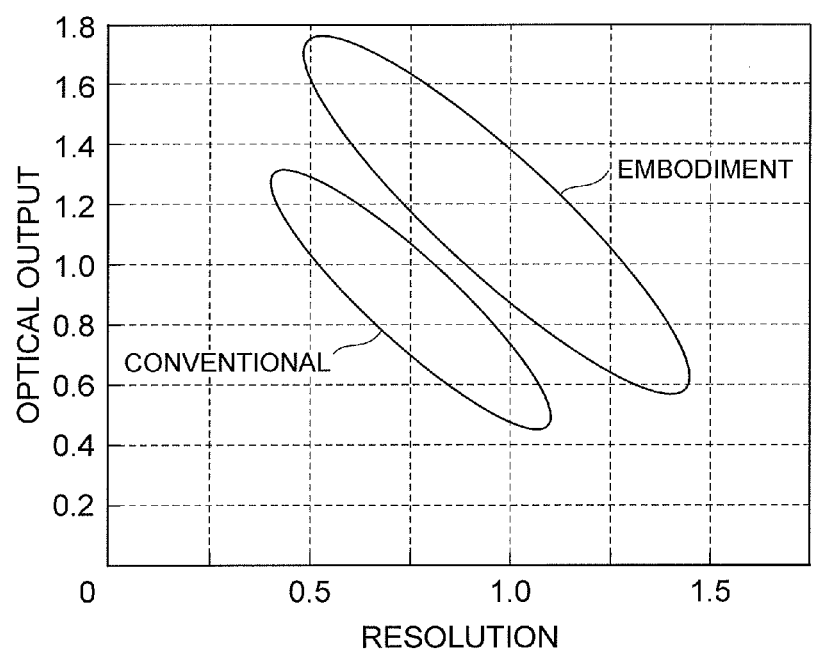
[FIG. 6] is a graph illustrating tendencies of the optical output and resolution of scintillator panels.

FIGS. 5 and 6 are a set of charts and graph illustrating tendencies of the optical output and resolution of scintillator panels. In the graph, the abscissa indicates the relative value of resolution measured at 10 [Lp/mm] by using a CFT chart. The ordinate indicates the relative value of the optical output. The irradiation condition for the radiation R is a tube voltage of 30 kV with a tube current of 1.5 mA.

The above-mentioned advantageous effect of improving the optical output and resolution can be seen from the results illustrated in FIGS. 5 and 6. As illustrated in FIG. 5, an improvement of 10% or more over the conventional product is seen in each of the optical output and resolution in this embodiment. As illustrated in FIG. 6, the results show that the data of this embodiment is located on the upper right side of that of the conventional product. From this, it is seen that both of the optical output and resolution improve.

Though a preferred embodiment of the present invention is explained in the foregoing, the scintillator panel in accordance with the present invention is not limited to the above-mentioned scintillator panel in accordance with the embodiment, but may also be any of modifications within a scope not changing the gist set forth in each claim or one applied to others.

Figure 7:
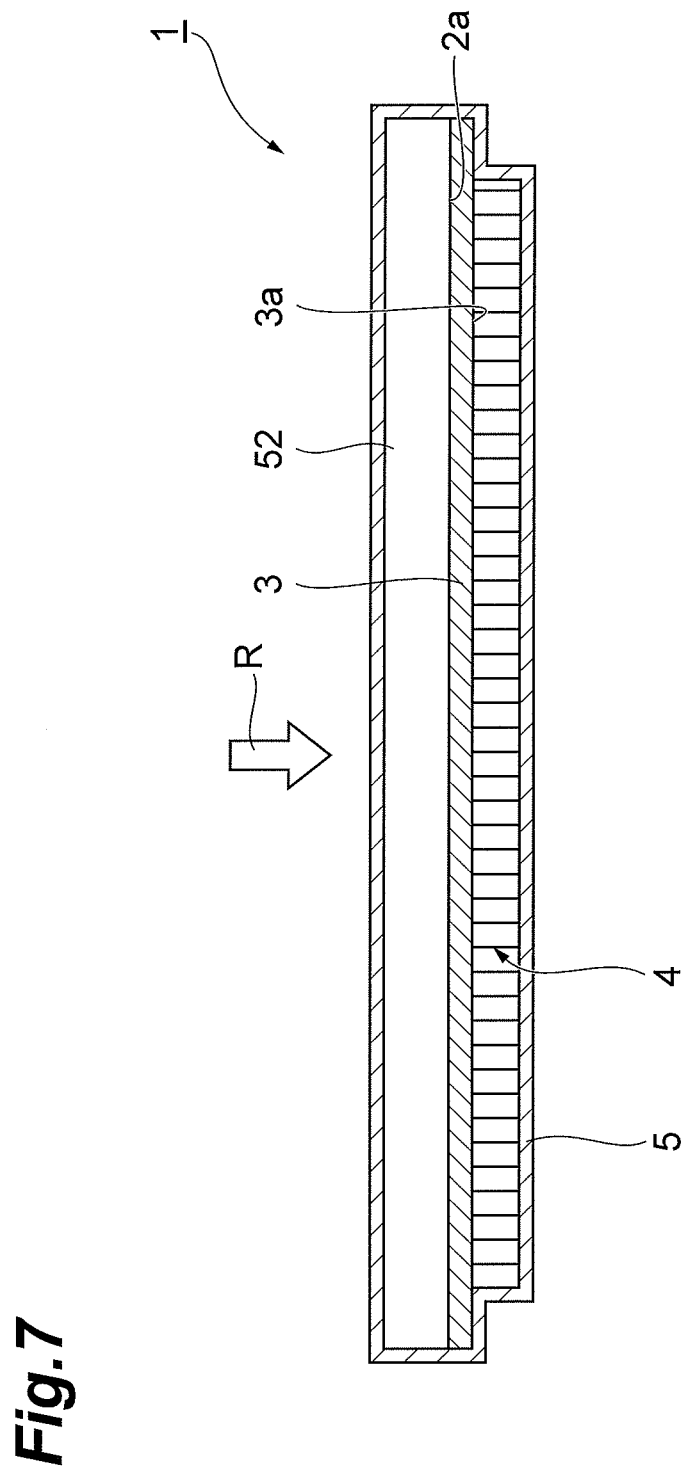
[FIG. 7] is a schematic side sectional view illustrating a modified example of the present invention.

For example, while the above-mentioned embodiment is equipped with the FOP 2 as a substrate, a radiation-transmitting substrate (metal substrate, carbon substrate, resin substrate, or the like) 52 may be provided instead as illustrated in FIG. 7. When the substrate is the radiation-transmitting substrate 52, the radiation image passes through the substrate 52, so as to be made incident on the scintillator 4 and thereby converted into a visible light image corresponding to the radiation image. The visible light image is emitted from the leading end side of the scintillator 4, so as to be detected by an image sensor optically coupled thereto.

In this case, for increasing the optical output of the scintillator panel 1, a light-reflecting film may be interposed between the substrate 52 and the heat-resistant resin layer 3, so that the heat-resistant resin layer 3 is disposed on the front face of the light reflecting film. This is also effective in preventing the light-reflecting film, when it is a metal film, from corroding under the influence of moisture and the like.

Figure 8:
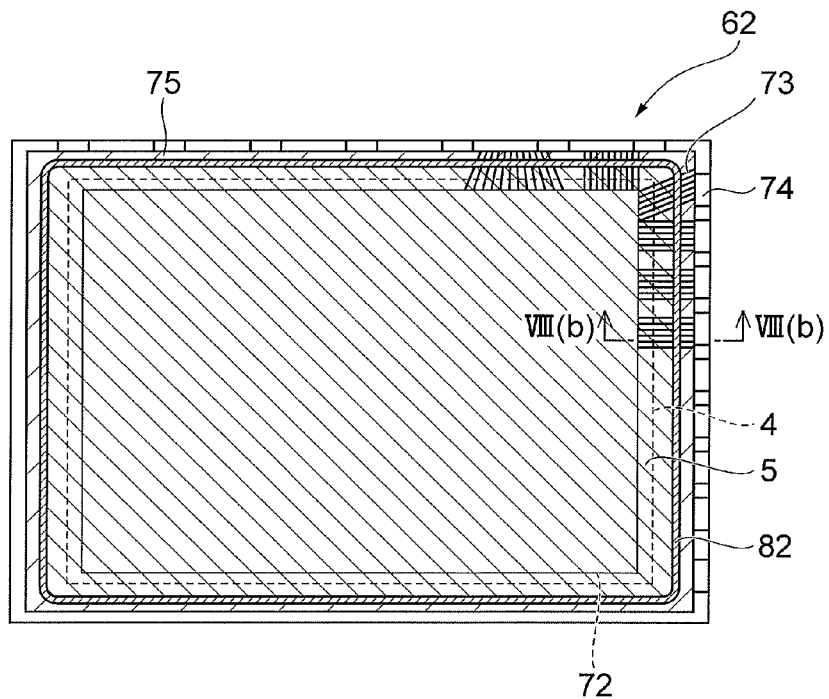
[FIG. 8] (a) is a schematic plan view illustrating another modified example of the present invention, while (b) is a sectional view taken along the line VIII(b)-VIII(b) of FIG. 8(a).
Figure 8:
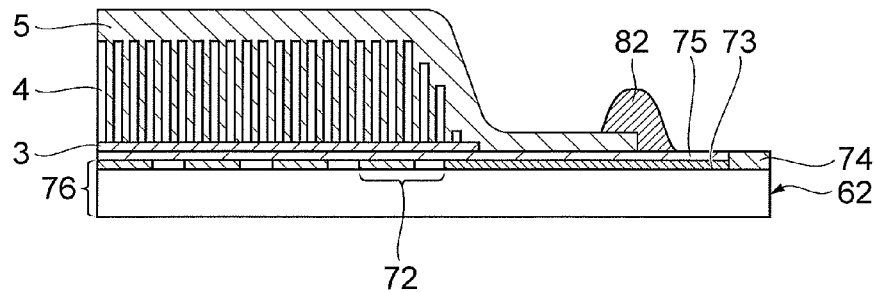

As illustrated in FIG. 8, the substrate may be an image sensor 76, on which the heat-resistant resin layer 3 is formed (the radiation image conversion panel being also referred to as radiation detector when the substrate is the image sensor 76). In this case, the image sensor 76 can be constructed as follows. On an insulating substrate 62 (which is made of glass, for example), light-receiving devices 72 which perform photoelectric conversion are arranged two-dimensionally, so as to form a light-receiving section. Each light-receiving device 72 is constituted by a photodiode (PD) made of amorphous silicon or a thin-film transistor (TFT). The light-receiving devices 72 are electrically connected to each other through signal lines 73 for reading signals. A plurality of bonding pads 74 for taking out signals to external circuits (not depicted) are arranged so as to be exposed along the outer periphery of the substrate 62 and electrically connected to the light-receiving device 72 through the signal lines 73. An insulating passivation film 75 is formed on the light-receiving devices 72 and signal lines 73. The outer peripheral part of the protective film 5 is coated with a coating resin 82.

In the present invention, the crystal form becomes favorable in the root part (on the vapor deposition start side) 4x of the scintillator 4 as mentioned above. Hence, the present invention exhibits remarkable effects when employed in one emitting the scintillation light from the root part 4x side of the scintillator 4 (the scintillator panel (radiation detector) equipped with the FOP 2 or image sensor 76 as the substrate).

Various curing conditions can be employed without being restricted to the above-mentioned A- to C-stages as long as the crystallinity can be made favorable in the root part 4x of the scintillator 4. In the above, "pillar form substantially equal" is meant in a broad sense including pillar forms identical to each other, similar to (like) each other, approximating each other, and the like.

There is a case where the heat-resistant resin layer 3 in the above-mentioned embodiment is constructed such that the columnar crystal in the root part 4x of the scintillator 4 has a pillar form, for example, as illustrated in the following. This seems to be because the crystallinity of the columnar crystal in the root part 4x has a correlation with at least one of the elasticity, thermal expansion coefficient, contractility, surface state, and lattice constant of the heat-resistant resin layer 3.

That is, there is a case where the elasticity of the heat-resistant resin layer 3 is in a predetermined elasticity region and/or its thermal expansion coefficient is in a predetermined thermal expansion coefficient region, so that the columnar crystal is constructed into a pillar form in the root part 4x. There is also a case where the heat-resistant resin layer 3 has a predetermined contractility, so that the columnar crystal is constructed into a pillar form in the root part 4x. Further, there is a case where the surface state of the heat-resistant resin layer 3 is set appropriately, so that the columnar crystal is constructed into a pillar form in the root part 4x. Furthermore, there is a case where the lattice constant of the heat-resistant resin layer 3 is matched appropriately, so that the columnar crystal is constructed into a pillar form in the root part 4x.

The surface energy may be adjusted not only by the kind of resin or the curing method, but also by irradiation with UV rays or electron beams. CsI(Na), NaI(Tl), LiI(Eu), KI(Tl), or the like may also be used as the scintillator 4 without being restricted to CsI(Tl) employed in the above-mentioned embodiment. Though the radiation image conversion panel is explained in terms of a scintillator panel using a scintillator for a phosphor in the above, the present invention is also applicable to radiation image conversion panels using photo-stimulable phosphors constituted by columnar crystals of CsBr(Eu) and the like.

It is sufficient for the heat-resistant resin layer (resin layer) 3 to exist in an effective region of the scintillator (phosphor) 4, while the heat-resistant resin layer 3 and scintillator 4 may have the same area or any of them may have an area larger than the other.

Industrial Applicability

The present invention can improve the optical output and resolution in radiation image conversion panels.

Reference Signs List

1 . . . scintillator panel (radiation image conversion panel); 2 . . . fiber optic plate (substrate); 2a . . . front face (main face) of the fiber optic plate; 3 . . . heat-resistant resin layer (resin layer); 3a . . . front face (main face) of the heat-resistant resin layer; 4 . . . scintillator (phosphor); 52 . . . substrate; 76 . . . image sensor (substrate)

The invention claimed is:

1. A radiation image conversion panel comprising a substrate, a step-cured resin layer subjected to a step-by-step curing process and formed on a main face of the substrate, and a phosphor formed during a curing reaction of the resin layer by vapor deposition on a main face of the resin layer on a side opposite from the substrate and made of a columnar crystal;
wherein at least the main face of the resin layer has a surface energy of at least 20[mN/m] but less than 35 [mN/m].

2. A radiation image conversion panel according to claim 1, wherein the resin layer is formed by a silicone resin.

3. A radiation image conversion panel according to claim 1, wherein the surface energy of at least the main face of the resin layer is set according to the crystallinity of the phosphor.

4. A radiation image conversion panel according to claim 1, wherein the substrate is a radiation-transmitting substrate.

5. A radiation image conversion panel according to claim 1, wherein the substrate is a fiber optic plate.

6. A radiation image conversion panel according to claim 1, wherein the substrate is an image sensor.

7. A radiation image conversion panel comprising a substrate, a step-cured resin layer subjected to a step-by-step curing process and formed on a main face of the substrate, and a phosphor formed by during a curing reaction of the resin layer vapor deposition on a main face of the resin layer on a side opposite from the substrate and made of a columnar crystal;
wherein the phosphor is constructed such that the columnar crystal has a pillar form on the substrate side.

8. A radiation image conversion panel comprising a substrate, a step-cured resin layer subjected to a step-by-step curing process and formed on a main face of the substrate, and a phosphor formed during a curing reaction of the resin layer by vapor deposition on a main face of the resin layer on a side opposite from the substrate and made of a columnar crystal;
wherein the columnar crystal on the substrate side of the phosphor has a pillar form substantially equal to that of the columnar crystal on the opposite side.

9. A radiation image conversion panel comprising a fiber optic plate constituted by a bundle of a plurality of optical fibers and a phosphor made of a columnar crystal;
the radiation image conversion panel further comprising a heat-resistant step-cured resin layer subjected to a step-by-step curing process and formed on a main face of the fiber optic plate and transparent to output light emitted from the phosphor;
wherein the phosphor is formed during a curing reaction of the resin layer by vapor deposition on a main face of the heat-resistant resin layer on a side opposite from the fiber optic plate.

10. A radiation image conversion panel according to claim 9, wherein the resin layer is formed by a silicone resin.

11. A radiation image conversion panel according to claim 9, wherein the surface energy of at least the main face of the resin layer is set according to the crystallinity of the phosphor.

12. A radiation image conversion panel comprising:
a fiber optic plate constituted by a bundle of a plurality of optical fibers;
a heat-resistant step-cured resin layer subjected to a step-by-step curing process and formed on a main face of the fiber optic plate; and
a phosphor formed during a curing reaction of the resin layer by vapor deposition on a main face of the heat-resistant layer on a side opposite from the fiber optic plate and made of a columnar crystal;
wherein the phosphor is constructed such that the columnar crystal has a pillar form on the fiber optic plate side.

13. A radiation image conversion panel comprising:
a fiber optic plate constituted by a bundle of a plurality of optical fibers;
a heat-resistant step-cured resin layer subjected to a step-by-step curing process and formed on a main face of the fiber optic plate; and
a phosphor formed during a curing reaction of the resin layer by vapor deposition on a main face of the heat-resistant layer on a side opposite from the fiber optic plate and made of a columnar crystal;
wherein the columnar crystal on the fiber optic plate side of the phosphor has a pillar form substantially equal to that of the columnar crystal on the opposite side.

* * * * *